United States Patent
Jeong

(10) Patent No.: US 10,248,840 B2
(45) Date of Patent: Apr. 2, 2019

(54) METHOD AND SYSTEM FOR AUTOMATICALLY TRACKING FACE POSITION AND RECOGNIZING FACE

(71) Applicant: FIVEGT CO., LTD, Seoul (KR)

(72) Inventor: Gyu Taek Jeong, Seongnam-si (KR)

(73) Assignee: FIVEGT CO., LTD, Seoul (KR)

( * ) Notice: Subject to any disclaimer, the term of this patent is extended or adjusted under 35 U.S.C. 154(b) by 85 days.

(21) Appl. No.: 14/892,804

(22) PCT Filed: May 2, 2014

(86) PCT No.: PCT/KR2014/003930
§ 371 (c)(1),
(2) Date: Nov. 20, 2015

(87) PCT Pub. No.: WO2014/189216
PCT Pub. Date: Nov. 27, 2014

(65) Prior Publication Data
US 2016/0092724 A1    Mar. 31, 2016

(30) Foreign Application Priority Data

May 22, 2013   (KR) .......................... 10-2013-0057641

(51) Int. Cl.
*G06K 9/00*   (2006.01)
*G01B 11/14*   (2006.01)
(Continued)

(52) U.S. Cl.
CPC .......... *G06K 9/00255* (2013.01); *G01B 11/14* (2013.01); *G06K 9/00288* (2013.01);
(Continued)

(58) Field of Classification Search
CPC .......... G06K 9/00288; G06K 9/00926; G06K 9/00255; G01B 11/14; H04N 5/332;
(Continued)

(56) References Cited

U.S. PATENT DOCUMENTS

2016/0110588 A1*   4/2016   Ikenoue ............. H04N 5/23219
382/118

FOREIGN PATENT DOCUMENTS

CN    1254904         5/2000
EP    2763397 A1 *   8/2014   ....... H01L 27/14621
(Continued)

OTHER PUBLICATIONS

Written Opinion with English Translation for International Application No. PCT/KR2014/003930, dated Sep. 18, 2014.
(Continued)

*Primary Examiner* — Loi H Tran
(74) *Attorney, Agent, or Firm* — Kile Park Reed & Houtteman PLLC

(57) ABSTRACT

Provided are a method and system for automatically tracking a face position and recognizing a face. In the present invention, after a face image of a user is captured, a capturing unit is moved such that the face image is moved to a face authentication region where optimum face recognition is performed, thereby having a changed capturing direction. This can allow face recognition of the user to be executed without movement of the user. Accordingly, convenience in face recognition can be maximized. Further, a plurality of registered face images are stored with matching frequencies indicating the number of times that the plurality of registered face images have been matched with an authentication image, and the authentication image is firstly compared with registered face images having large matching frequencies. This can enhance a face recognition speed.

14 Claims, 12 Drawing Sheets

(51) Int. Cl.
 *H04N 5/225* (2006.01)
 *H04N 5/33* (2006.01)
(52) U.S. Cl.
 CPC ....... *G06K 9/00926* (2013.01); *H04N 5/2251* (2013.01); *H04N 5/2256* (2013.01); *H04N 5/2258* (2013.01); *H04N 5/33* (2013.01); *H04N 5/332* (2013.01)
(58) Field of Classification Search
 CPC ...... H04N 5/2258; H04N 5/33; H04N 5/2251; H04N 5/2256
 USPC ......................................................... 348/77
 See application file for complete search history.

(56) References Cited

FOREIGN PATENT DOCUMENTS

| | | | | | |
|---|---|---|---|---|---|
| GB | 2343945 A | * | 5/2000 | ........... | G01S 3/7864 |
| JP | 2000-163600 | | 6/2000 | | |
| KR | 10-2005-0109338 | | 11/2005 | | |
| KR | 10-2011-0139869 | | 12/2011 | | |
| KR | 10-1180471 | | 9/2012 | | |
| KR | 10-1222928 | | 1/2013 | | |

OTHER PUBLICATIONS

International Search Report with English translation for International Application No. PCT/KR2014/003930, dated Sep. 18, 2014.

\* cited by examiner

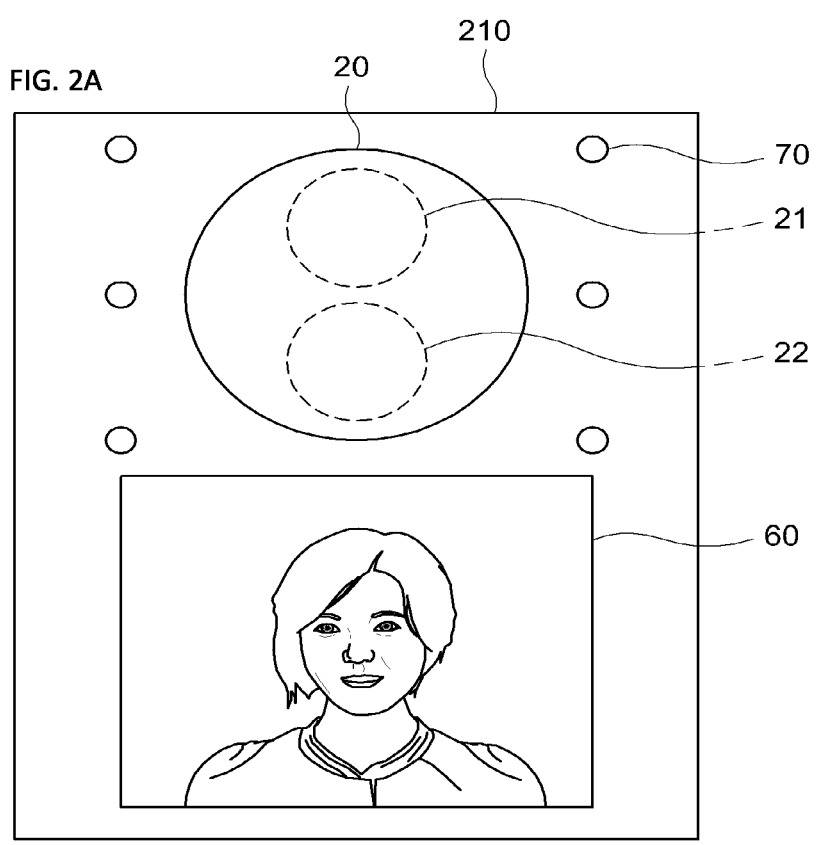

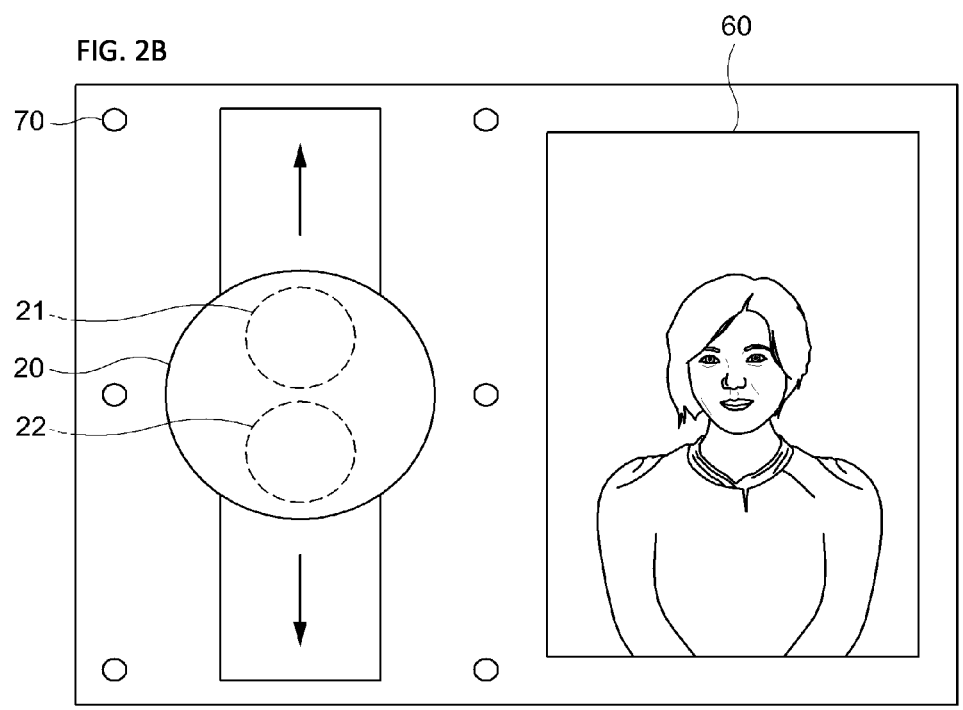

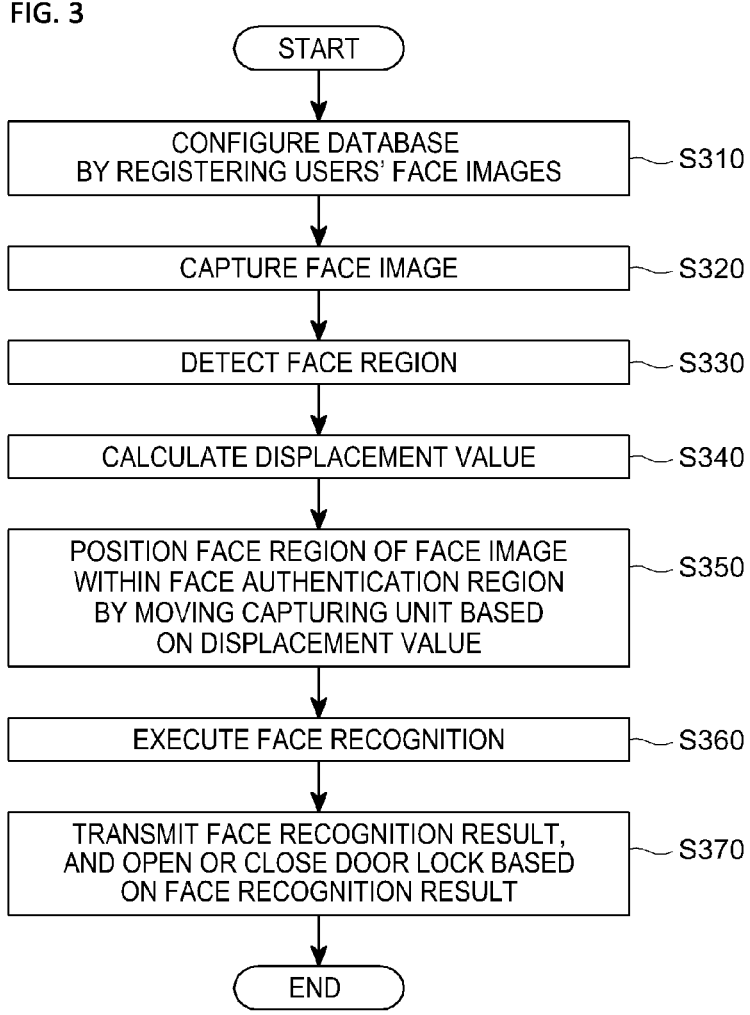

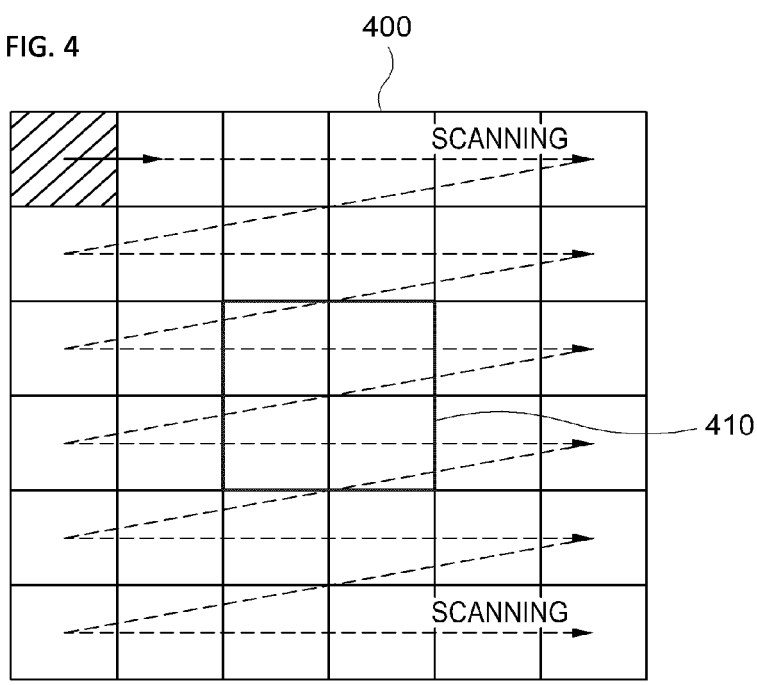

METHOD AND SYSTEM FOR AUTOMATICALLY TRACKING FACE POSITION AND RECOGNIZING FACE

TECHNICAL FIELD

The present invention relates to a face recognition method and a face recognizing system, and more particularly, to a method and system for automatically tracking a face position and recognizing a face.

BACKGROUND ART

The conventional various systems for recognizing a face have been developed to be commercialized. The conventional systems have been designed to capture a face image of a user when the user is located at a central position in front of a camera, and to implement optimum face recognition performance when the face image is included in a "face authentication region".

However, the conventional face recognition system may have the following problem. Since the camera is fixed at a predetermined height, when a face position of a user is out of range of the "face authentication region" due to a height of the user, face authentication may fail.

In order to solve such a problem, in the conventional face recognition system, a face image of a user is displayed on a display unit, and a face authentication region is also displayed on the display unit, thereby allowing the user to move himself or herself such that his or her face image is located within the face authentication region. This may cause user's inconvenience, and thus prevent the conventional face recognition system from being widely used.

DISCLOSURE OF THE INVENTION

Therefore, an object of the present invention is to provide to a method and system for automatically tracking a face position and recognizing a face, without a user's movement.

To achieve these and other advantages and in accordance with the purpose of the present invention, as embodied and broadly described herein, there is provided a system for automatically tracking a face position and recognizing a face, including: a capturing unit configured to capture a face image of a user; a face region detection unit configured to detect a face region from the face image, and to output position information of the detected face region; a displacement calculation unit configured to measure a displacement of the capturing unit based on the face region position information, such that the face region captured by the capturing unit is moved to a face authentication region; and a driving unit configured to move the capturing unit based on the displacement.

In a preferred embodiment of the present invention, the displacement calculation unit may be configured to measure an up-down rotation angle displacement and a right-left rotation angle displacement of the capturing unit, and the driving unit may be configured to change a direction of the capturing unit based on the rotation angle displacement.

In a preferred embodiment of the present invention, the displacement calculation unit may be configured to measure an up-down linear displacement and a right-left rotation angle displacement of the capturing unit, and the driving unit may be configured to change a direction of the capturing unit based on the linear displacement and the rotation angle displacement.

In a preferred embodiment of the present invention, the face region detection unit may detect a face region by sequentially examining the face image input from the capturing unit, in unit of blocks having a predetermined size.

In a preferred embodiment of the present invention, the system may further include a display unit configured to output the face image to the user. The capturing unit may include an infrared ray camera and a color camera. A face image captured by the infrared ray camera may be output to the face region detection unit, and a face image captured by the color camera may be output to the display unit.

In a preferred embodiment of the present invention, the system may further include an illumination unit installed near the capturing unit and configured to illuminate a face of the user.

In a preferred embodiment of the present invention, the system may further include a face recognition unit configured to execute face recognition by comparing an authentication image input from the face region detection unit, with a plurality of registered face images pre-stored in a database. The face recognition unit may execute face recognition by storing the plurality of registered face images with matching frequencies indicating the number of times that the plurality of registered face images have been matched with the authentication image, and by sequentially comparing the authentication image with from registered face images having large matching frequencies when the authentication image is input from the face region detection unit.

In a preferred embodiment of the present invention, the face images stored in the database may be classified into a plurality of groups in order of large matching frequency. The face recognition unit may firstly compare the authentication image with users' registered face images which belong to a group having a largest matching frequency, and then compare the authentication image with users' registered face images which belong to a group having a next largest matching frequency.

In a preferred embodiment of the present invention, the face recognition unit may replace a registered face image having a smallest matching frequency, among the plurality of registered face images, by the authentication image, at a predetermined time period.

In a preferred embodiment of the present invention, the system may further include: a face recognition unit configured to execute face recognition by comparing an authentication image input from the face region detection unit, with a plurality of registered face images pre-stored in a database; and a communication unit configured to transmit a face recognition result input from the face recognition unit, to a door lock in a wired or wireless manner, such that the door lock is open or closed based on the face recognition result.

To achieve these and other advantages and in accordance with the purpose of the present invention, as embodied and broadly described herein, there is also provided a method for automatically tracking a face position and recognizing a face, including: (a) capturing a face image of a user by a capturing unit; (b) detecting a face region from the face image, and outputting position information of the detected face region; (c) calculating a displacement of the capturing unit based on the face region position information, such that the face region is moved to a face authentication region; and (d) moving the capturing unit based on the displacement.

In a preferred embodiment of the present invention, in the step (c), an up-down rotation angle displacement and a right-left rotation angle displacement of the capturing unit may be measured, and in the step (d), a direction of the capturing unit may be changed based on the rotation angle displacement.

In a preferred embodiment of the present invention, in the step (c), an up-down linear displacement and a right-left rotation angle displacement of the capturing unit may be measured, and in the step (d), a direction of the capturing unit may be changed based on the linear displacement and the rotation angle displacement.

In a preferred embodiment of the present invention, in the step (b), a face region may be detected by sequentially examining the face image input from the capturing unit, in unit of blocks having a predetermined size.

In a preferred embodiment of the present invention, the capturing unit may include an infrared ray camera and a color camera. In the step (a), a face image of the user captured by the color camera may be output to a display unit. And in the step (b), a face region may be detected from a face image captured by the infrared ray camera.

In a preferred embodiment of the present invention, in the step (a), a face image of the user may be captured by illuminating a face of the user by an illumination unit installed near the capturing unit.

In a preferred embodiment of the present invention, the method may further include (e) executing face recognition by comparing an authentication image located within the face authentication region with a plurality of registered face images pre-stored in a database, if the face image is located within the face authentication region as the capturing unit is moved. The database may store therein the plurality of registered face images with matching frequencies indicating the number of times that the plurality of registered face images have been matched with the authentication image. In the step (e), face recognition may be executed by sequentially comparing the authentication image with from registered face images having large matching frequencies.

In a preferred embodiment of the present invention, the face images stored in the database may be classified into a plurality of groups in order of large matching frequency. In the step (e), the authentication image may be firstly compared with users' registered face images which belong to a group having a largest matching frequency, and then may be compared with users' registered face images which belong to a group having a next largest matching frequency.

In a preferred embodiment of the present invention, in the step (e), a registered face image having a smallest matching frequency, among the plurality of registered face images, may be replaced by the authentication image, at a predetermined time period.

In a preferred embodiment of the present invention, the method may further include (e) executing face recognition by comparing an authentication image located within the face authentication region with a plurality of registered face images pre-stored in a database, if the face image is located within the face authentication region as the capturing unit is moved; and (f) transmitting a face recognition result to a door lock in a wired or wireless manner, such that the door lock is open or closed based on the face recognition result obtained in the step (e).

The present invention can have the following advantages.

Firstly, after a face image of a user is captured, a face image of the user which is located on any position is detected. Then, the capturing unit is moved such that the face image is moved to a face authentication region where optimum face recognition is performed, thereby having a changed capturing direction. This can allow face recognition of the user to be executed without movement of the user. Accordingly, convenience in face recognition can be maximized.

Secondly, a plurality of registered face images are stored with matching frequencies indicating the number of times that the plurality of registered face images have been matched with an authentication image, and the authentication image is firstly compared with registered face images having large matching frequencies. This can enhance a face recognition speed.

Thirdly, a registered face image having a small matching frequency is replaced by a new face image at a predetermined time period. This can allow a user's face which is changed due to growth or aging, to be adaptively reflected to face recognition.

BRIEF DESCRIPTION OF THE DRAWINGS

FIGS. 2A and 2B are block diagrams illustrating implementation examples of a system for automatically tracking a face position and recognizing a face according to a preferred embodiment of the present invention;

FIG. 3 is a flowchart illustrating a method for automatically tracking a face position and recognizing a face according to a preferred embodiment of the present invention;

FIG. 4 is a view illustrating a method for detecting a face region according to a preferred embodiment of the present invention;

MODES FOR CARRYING OUT THE PREFERRED EMBODIMENTS

Description will now be given in detail of a method and system for automatically tracking a face position and recognizing a face according to preferred embodiments, with reference to the accompanying drawings.

Figure 1:
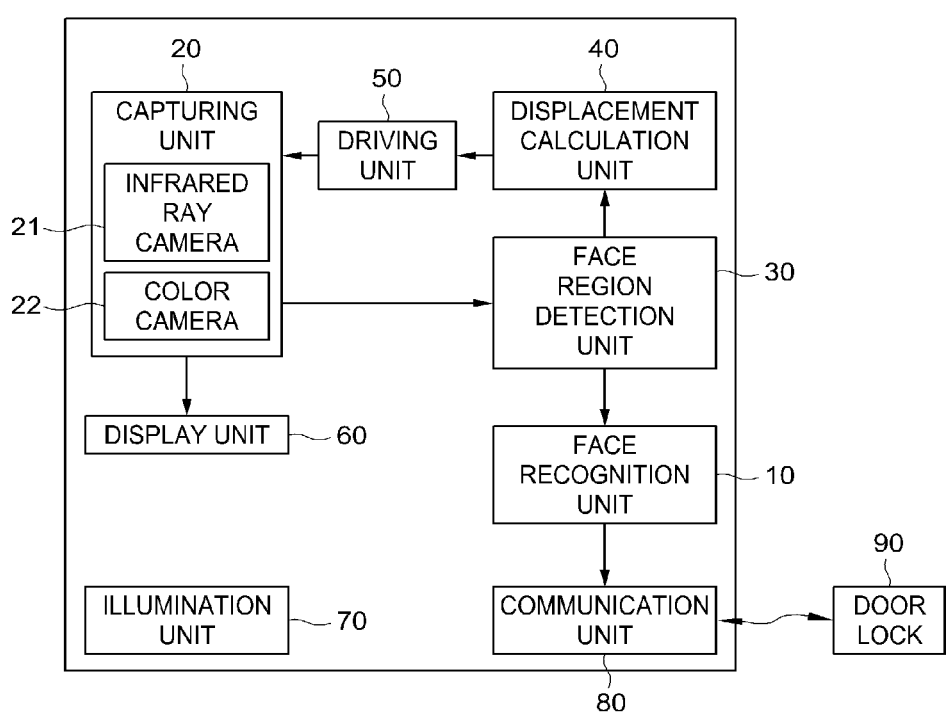
FIG. 1 is a block diagram illustrating a system for automatically tracking a face position and recognizing a face according to a preferred embodiment of the present invention.

FIG. 1 is a block diagram illustrating a system for automatically tracking a face position and recognizing a face according to a preferred embodiment of the present invention. FIGS. 2A and 2B are block diagrams illustrating implementation examples of a system for automatically tracking a face position and recognizing a face according to a preferred embodiment of the present invention. FIG. 3 is a flowchart illustrating a method for automatically tracking a face position and recognizing a face according to a preferred embodiment of the present invention.

Referring to FIGS. 1 to 3, the system for automatically tracking a face position and recognizing a face according to a preferred embodiment of the present invention includes a capturing unit 20, a driving unit 50, a displacement calculation unit 40, a face region detection unit 30, a display unit 60, an illumination unit 70, a face recognition unit 10, and a communication unit 80.

In the system for automatically tracking a face position and recognizing a face according to a preferred embodiment of the present invention, face images of users are registered to a database 16 to be explained later with reference to FIG. 6, thereby configuring the database 16 (S310). In this case, feature information extracted from the face images may be registered together with the face images.

Then, upon driving of the system for automatically tracking a face position and recognizing a face according to a preferred embodiment of the present invention, the capturing unit 20 captures a face image of a user, and outputs the face image to the face region detection unit 30 (hereinafter, will be referred to as 'detection unit')(S320).

Preferably, the capturing unit 20 basically includes an infrared ray camera 21, and further includes a color camera 22. An image captured by the infrared ray camera 21 is output to the detection unit 30, thereby being used to detect a face region and to recognize a face as explained later. And an image captured by the color camera 22 is output to the display unit 60 such that a user views his or her currently-captured image.

Referring to FIG. 2A, the capturing unit 20 is coupled to a fixed position of a base unit 210 installed on a wall surface, etc. The capturing unit 20 is coupled to the base unit 210 so as to be rotated up and down, and right and left. Referring to FIG. 2B, the capturing unit 20 is coupled to the base unit 210 so as to be linearly moved up and down along a movement rail 220 of the base unit 210, and so as to be rotated right and left.

The detection unit 30 detects a face region from the face image input from the infrared ray camera 21, and outputs position information of the detected face region (face region position information) to the displacement calculation unit 40 (S330).

For detection of a face region, the detection unit 30 may execute a pre-processing such as a size control and a pixel conversion, with respect to a face image captured by the infrared ray camera 21. Then, the detection unit 30 may extract a face region from the pre-processed face image.

FIG. 4 is a view illustrating a method for detecting a face region according to a preferred embodiment of the present invention. Referring to FIG. 4, the detection unit 30 detects a face region by dividing the face image input from the infrared ray camera 21 into a preset number of blocks 400, and by sequentially examining the divided blocks.

As indicated by arrows of FIG. 4, the detection unit 30 sequentially examines blocks (1, 1)~(6, 1), and then sequentially examines blocks (1, 2)~(6, 2). In the same manner, the detection unit 30 sequentially examines blocks (1, 3)~(6, 6), thereby detecting a face region. In FIG. 4, a captured face image is divided into 36 blocks. However, this is merely for explanatory convenience, and thus the captured face image may be divided into more blocks. Further, in FIG. 4, the blocks 400 are sequentially examined in a horizontal direction. However, the blocks 400 may be sequentially examined in a vertical direction, for detection of a face region. Further, a well-known algorithm may be applied to a face region detecting method.

The displacement calculation unit 40 calculates a displacement value (a rotation angle displacement, a linear displacement, etc.) of the capturing unit 20 according to the face region position information received from the detection unit 30, such that the face region captured by the capturing unit 20 is moved to a face authentication region 510. Then, the displacement calculation unit 40 outputs the calculated displacement value to the driving unit 50 (S340), The driving unit 50 moves the capturing unit 20 according to the displacement value input from the displacement calculation unit 40, thereby positioning the face region of the face image within the face authentication region (S350).

Figure 5:
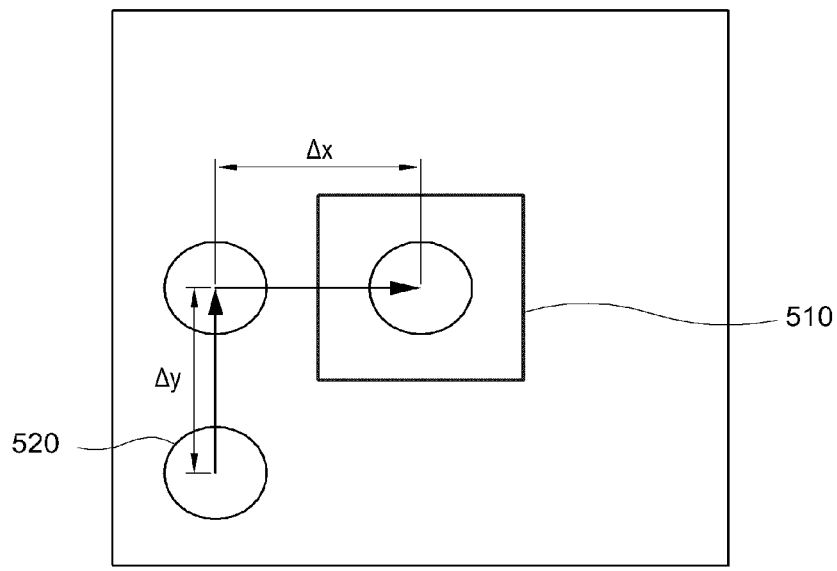
FIG. 5 is a view illustrating a method for controlling a capturing unit by measuring a displacement of a detected face image according to a preferred embodiment of the present invention.

FIG. 5 is a view illustrating a method for controlling the capturing unit 20 by measuring a displacement of a detected face image according to a preferred embodiment of the present invention. Referring to FIG. 5, the detection unit 30 detects a face region 520 of a user, which is on a left lower end, from a captured entire face image. And the detection unit 30 outputs face region position information of the face region 520 to the displacement calculation unit 40. Then, the displacement calculation unit 40 calculates a displacement value ($\Delta x$, $\Delta y$) between the center of the face region 520 and the center of the face authentication region 510, and outputting the calculated displacement value to the driving unit 50. Then, the driving unit 50 moves the capturing unit 20 such that the face region is located at the center of the face authentication region 510 after being moved by the displacement value ($\Delta x$, $\Delta y$).

Referring to FIG. 2A, the driving unit 50 downward-rotates the capturing unit 20 such that a capturing direction of the capturing unit 20 is moved by $\Delta y$, according to a rotation angle displacement input from the displacement calculation unit 40. Then, the driving unit 50 rotates the capturing unit 20 to the right such that capturing direction of the capturing unit 20 is moved by $\Delta x$. In this case, the capturing unit 20 may be rotated to the right, and then may be downward-rotated. Alternatively, such rotations may be simultaneously executed.

Referring to FIG. 2B, the driving unit 50 linearly-moves the capturing unit 20 downwardly along a movement rail 220 such that the capturing direction of the capturing unit 20 is moved by $\Delta y$, according to a linear displacement input from the displacement calculation unit 40. Then, the driving unit 50 rotates the capturing unit 20 to the right such that the capturing direction of the capturing unit 20 is moved by $\Delta x$ according to a rotation angle displacement input from the displacement calculation unit 40. In this case, the capturing unit 20 may be rotated to the right, and then may be linearly-moved downwardly. Alternatively, the linear motion and the rotation may be simultaneously executed.

The display unit 60 displays the face image received from the color camera 22, and the illumination unit 70 installed near the camera illuminates a face of the user. The illumination unit 70 may include therein an illumination sensor operated when a peripheral illumination level is lower than a preset value, and may further include therein a human body sensor for sensing a user.

Once the face region of the face image is located at the center of the face authentication region through the above processes, the detection unit 30 outputs the face image for authentication ('authentication image') to the face recognition unit 10. Then, the face recognition unit 10 performs a face recognition process by comparing the authentication image with a plurality of registered face images pre-stored in the database 16 (refer to FIG. 6) (S360). The face recognition process will be explained in more detail with reference to FIGS. 6 to 9C.

The face recognition unit 10 outputs a face recognition result to the communication unit 80 such that a door lock 90 is open or closed based on the face recognition result, and the communication unit 80 transmits the face recognition result to the door lock 90 in a wired or wireless manner. Then, the door lock 90 releases or maintains its locked state based on the received face recognition result (S370).

Hereinafter, a detailed configuration of the face recognition unit 10 and a face recognition method according to a preferred embodiment of the present invention will be explained with reference to FIGS. 6 to 9C.

Figure 6:
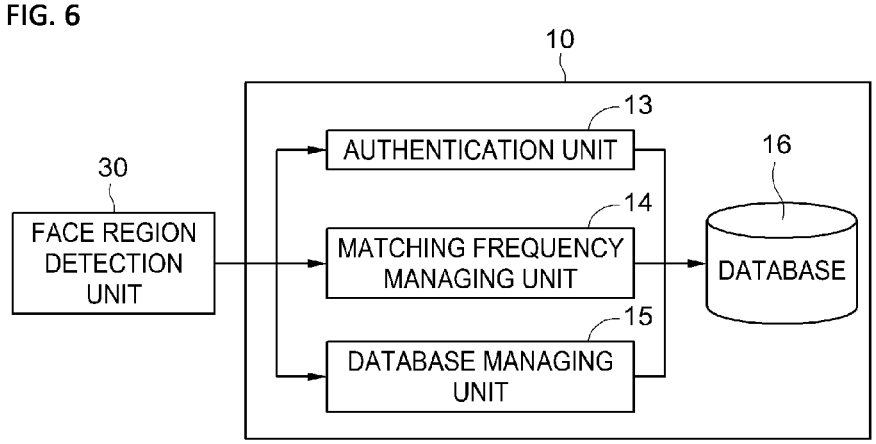
FIG. 6 is a detailed block diagram illustrating a face recognition unit of FIG. 1 according to a preferred embodiment of the present invention.

FIG. 6 is a detailed block diagram illustrating a configuration of the face recognition unit according to a preferred embodiment of the present invention.

Referring to FIG. 6, the face recognition unit 10 according to a preferred embodiment of the present invention includes an authentication unit 13, a matching frequency managing unit 14, a database managing unit 15 and a database 16.

The database 16 is configured to store therein face images registered by users, under control of the database managing unit 15. The database 16 may store only the face images, or may store only feature information extracted from face images and used to perform face recognition in an extracted manner. Alternatively, the database 16 may store both the face images and the feature information extracted from the face images. The database 16 also stores a matching frequency (the number of times that matching has been executed) of each registered image. It should be noted that the 'face image' to be explained later includes all the above concepts.

The database managing unit 15 manages users' face images stored in the database 16. In a user's image registration mode, the database managing unit 15 receives face images captured at various angles, or face images captured at predetermined time intervals, and stores the received face images in the database 16 by users. Further, the database managing unit 15 replaces a face image having a smallest matching frequency, among the users' registered face images, by a new face image, at a predetermined time period. Then, the database managing unit 15 stores the new face image in the database 16.

Further, the database managing unit 15 may classify the face images of each user stored in the database 16, into a plurality of groups, according to matching frequencies indicating that face images of each user have been used for face authentication.

A face authentication method and a face image update method according to a preferred embodiment of the present invention will be explained with reference to FIGS. 9A to 9C. A plurality of face images of each user are stored, and matching frequencies indicating that the face images of each user have been used for face authentication, are also stored. Among the plurality of face images, face images having a largest matching frequency are classified into a first group, and face images having a next largest matching frequency are classified into a second group. If all of the face images are completely classified in such a manner, groups are generated by the number of registered face images of each user, and face images which belong to the last group are replaced by new images at a predetermined time period.

Generally, a user's face is changing as time lapses. A face image having a smallest matching frequency is less useful for face authentication, and presumed to be captured so long ago that it cannot reflect a user's recent face image. Thus, in the present invention, a face image having a smallest matching frequency is replaced by a new face image at a predetermined time period (e.g., one month, six months, one year, etc.), thereby updating the face image into a face image which reflects a user's recent face. In this case, as the new face image, an authentication image is preferably used. However, a new face image registered in a face image registration mode may be used.

Once an image for face recognition ('authentication image') is input from the detection unit 30, the authentication unit 13 performs face authentication by comparing the authentication image with the plurality of face images stored in the database 16. And the matching frequency managing unit 14 updates matching frequencies of the stored face images, which have been used for user authentication, by +1, and stores the updated matching frequencies in the database 16.

Figure 8:
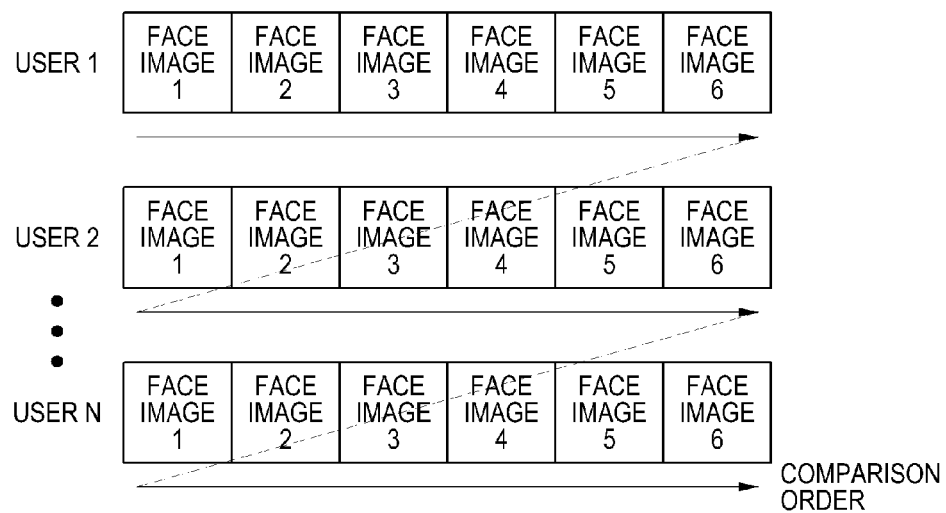
FIG. 8 is a view illustrating a face authentication method in accordance with the conventional art.

In the preferred embodiment of the present invention, since an authentication image is firstly compared with a face image which has been much used for user authentication, a recognition speed is enhanced. Referring to FIG. 8, in the conventional face authentication method, an input authentication image is compared with all registered face images of each user which have been stored in the database 16.

Referring to FIG. 8, it is assumed that the number of users registered to the database 16 is 10 (n=10), and each user has 6 registered face images. In the conventional method, an authentication image captured for authentication is firstly compared with the first to sixth face images of user 1, and then is compared with first to sixth face images of user 2. If the user who is waiting for authentication is user 10 and the authentication image is matched with the sixth face image of the user 10, 60 face images should be totally compared with the authentication image. This may cause an excessively long time to be taken in face authentication.

Figure 9A:
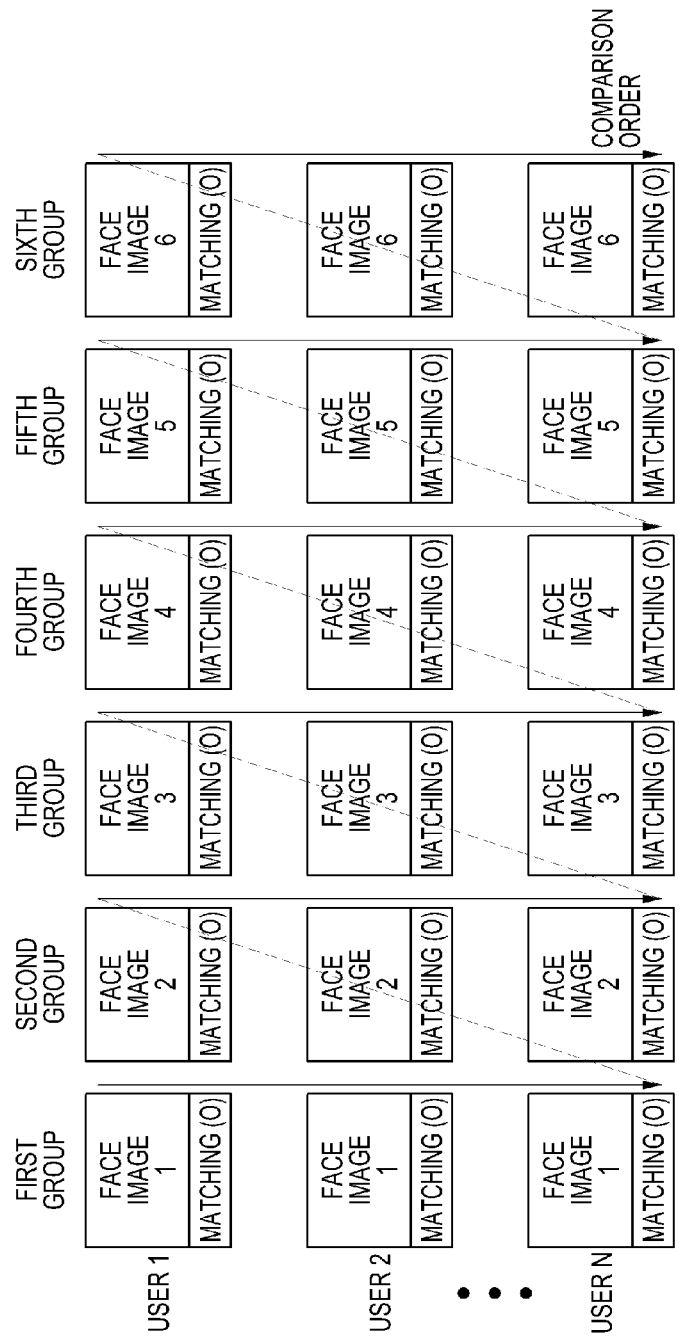
FIGS. 9A to 9C are views illustrating a face authenticating process and a face image updating process according to a preferred embodiment of the present invention.
Figure 9B:
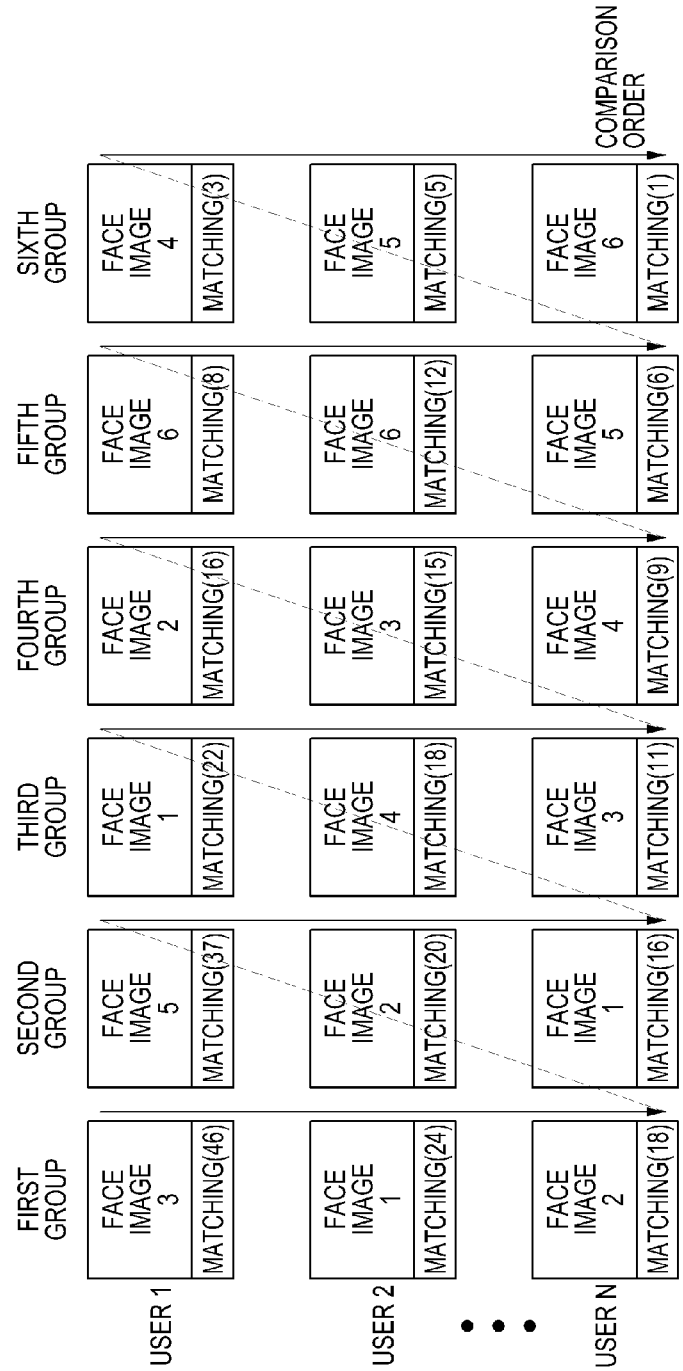
Figure 9C:
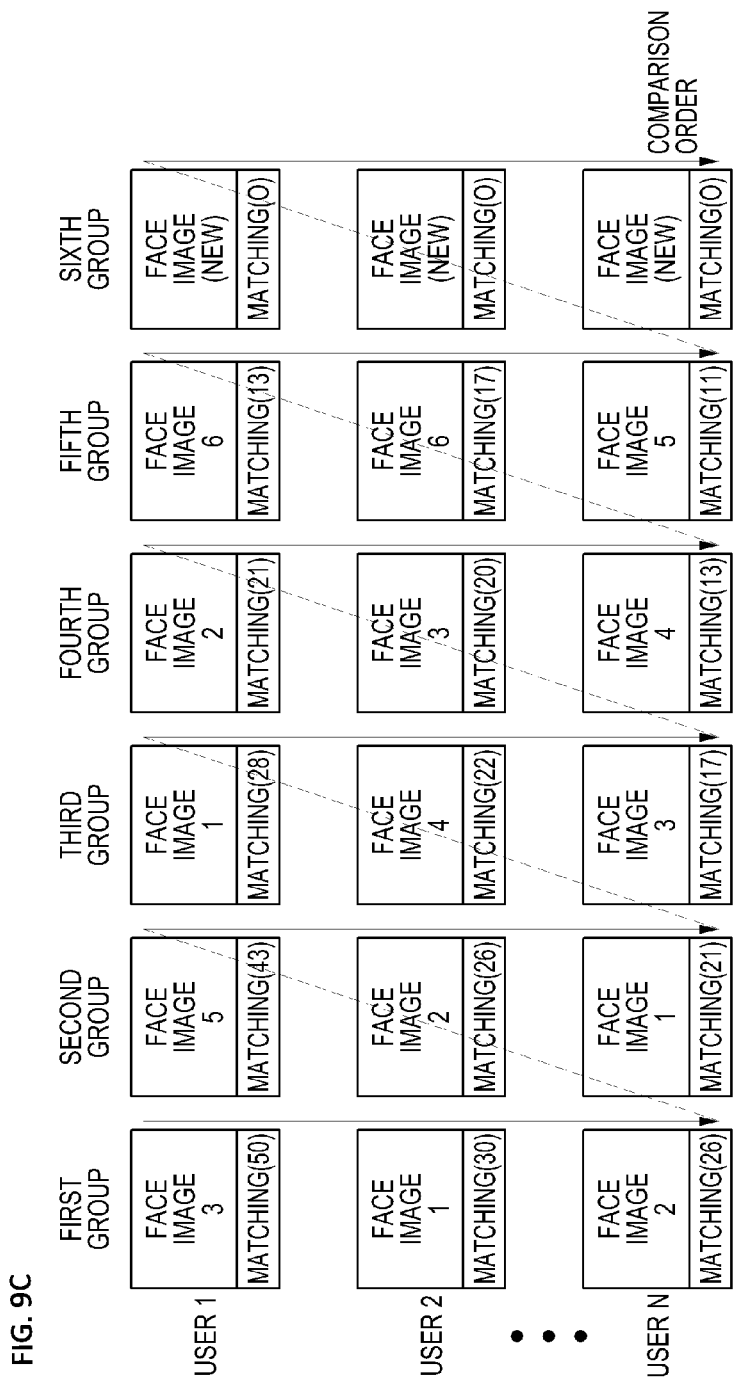

Thus, in the preferred embodiment of the present invention, as shown in FIGS. 9A to 9C, each face image is stored with a matching frequency indicating that the corresponding face image has been matched with the authentication image, i.e., the number of times that the corresponding face image has been used for face authentication. And the authentication image is firstly compared with a face image having a largest matching frequency.

Once the face images are registered according to the preferred embodiment of the present invention, as shown in FIG. 9A, all of the face images are sequentially stored in registered order. And the matching frequency of each face image is initially set to '0'.

Thereafter, whenever an authentication process is executed by the authentication unit 13, the matching frequency managing unit 14 updates the matching frequency of a face image which has been used for authentication, by +1, and registers the updated matching frequency in the database 16. And the matching frequency managing unit 14 adjusts the groups of the face images such that face images having a large matching frequency belong to upper groups, and face images having a small matching frequency belong to lower groups. As such processes are repeatedly performed, a face image of each user, which has a largest matching frequency, belongs to a first group, an uppermost group, and a face image of each user, which has a smallest matching frequency, belongs to a sixth group, a lowermost group. Face images which belong to the uppermost group are best matched with an authentication image, and the first group includes 'n' face images of 'n' users.

When an authentication image is input for face recognition, the authentication unit 13 firstly compares the authentication image with the registered face images which belong to the uppermost group, and then compares the authentication image with the registered face images which belong to the next uppermost group. That is, as shown in FIG. 9B, once an authentication image is input, the authentication unit 13 firstly compares the authentication image with the registered face images of 'n' users which belong to the first group. If the authentication process is not successful, the authentication unit 13 compares the authentication image with the registered face images which belong to the second group.

As face images which are more frequently matched with authenticating images are firstly compared with the authentication image, a face recognition speed may be more enhanced than in the conventional art.

As the face recognition is continuously executed, the matching frequency of each registered face image is changed. As a result, the registered face image gets to belong to another group. More specifically, the registered face image is moved to the upper group when its matching frequency is increased, but is moved to the lower group when its matching frequency is decreased.

The data base managing unit 15 updates the existing face image at a predetermined time period. As aforementioned, a user's face is changed due to growth or aging. If a registered face image which does not reflect a user's current face, it may get to belong to a lower group. Thus, the data base managing unit 15 replaces face images registered to the lowermost group (the sixth group) by new face images at a predetermined time period. As aforementioned, in the preferred embodiment of the present invention, the registered face image which belongs to the lowermost group is replaced by an authentication image. However, the registered face image may be replaced by an image captured in a face registration mode.

So far, the face recognition system according to a preferred embodiment of the present invention has been explained.

Hereinafter, a face recognition method according to a preferred embodiment of the present invention will be explained with reference to FIG. 7.

Figure 7:
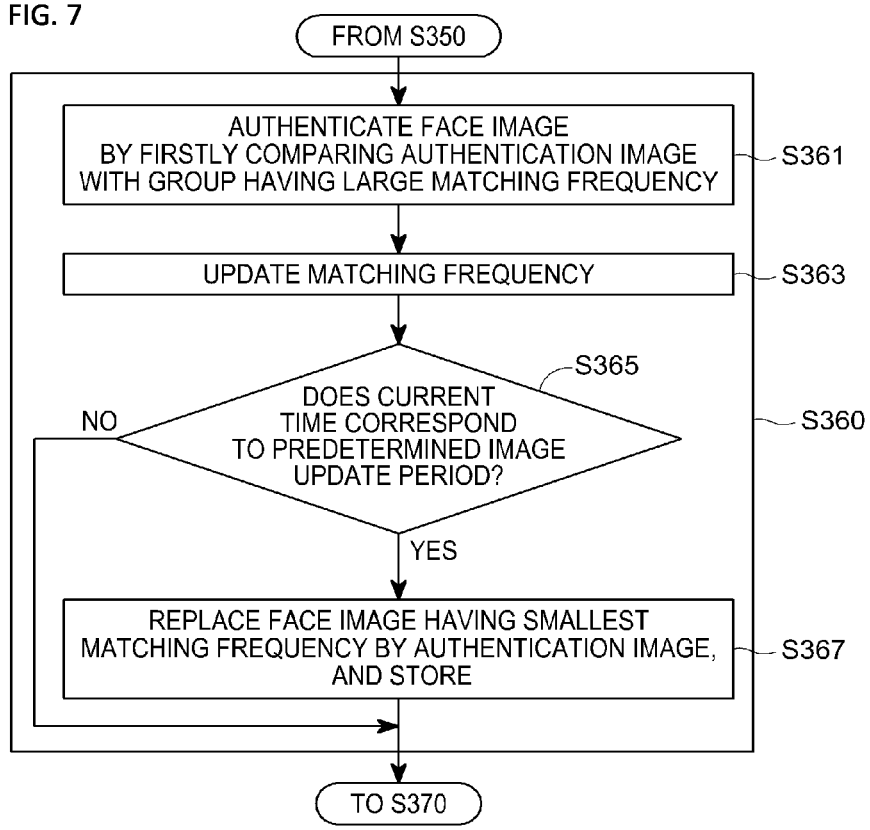
FIG. 7 is a view illustrating a face recognition method according to a preferred embodiment of the present invention.

FIG. 7 is a view illustrating a face recognition method according to a preferred embodiment of the present invention. It should be noted that all the functions aforementioned with reference to FIG. 6 are executed by the face recognition method according to a preferred embodiment of the present invention, and all functions to be explained with reference to FIG. 7 are executed by the face recognition unit 10 according to a preferred embodiment of the present invention.

Referring to FIG. 7, if the face recognition unit 10 receives an authentication image from the detection unit 30, the face recognition unit 10 executes a face image authentication process (S361). The face image authentication process is executed as the authentication image is firstly compared with a registered face image which belongs to a group having a large matching frequency. The detailed method has been aforementioned with reference to FIGS. 9A to 9C, and explanations thereof will be omitted.

If the face image authentication process is executed in S361, the matching frequency of the registered face image which has been used for authentication is updated. And the group where the registered face image belongs is changed according to the updated matching frequency (S363).

After the matching frequency is updated, it is determined whether a current time corresponds to an image update (replacement) period (S365).

If it is determined in S365 that the current time does not correspond to the image update period, S370 is executed.

On the contrary, if it is determined in S365 that the current time corresponds to the image update period, a registered face image having a smallest matching frequency is replaced by the authentication image. Then, the replaced face image is stored such that a user's current face is reflected to the database 16 (S367).

In the face recognition method according to a preferred embodiment of the present invention which has been aforementioned with reference to FIGS. 6 to 9C, registered face images of respective users are classified into a plurality of groups based on matching frequencies. And an authentication image is firstly compared with face images which belong to an upper group.

In a modified embodiment of the present invention, an authentication image may be firstly compared with registered face images having large matching frequencies, among all registered face images. For instance, referring to FIG. 9B, an authentication image may be sequentially compared with face image 3 of user 1, face image 5 of user 1, face image 1 of user 2, face image 1 of user 1, and face image 2 of user 2. In this case, the large matching frequencies indicate that the corresponding registered face images have been much used for face recognition, and mean that the corresponding registered face images have a high possibility to be re-used for face recognition. Accordingly, in the present invention, face recognition performance is more enhanced than in the conventional art.

In another modified embodiment of the present invention, an authentication image may be compared with all registered face images of one user, in order from a largest matching frequency to a smallest matching frequency. Then, the authentication image may be compared with all registered face images of another user, in order from a largest matching frequency to a smallest matching frequency.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The machine-readable medium may be distributed to a computer system connected thereto via a network, and computer-readable codes may be stored and executed in a distributed manner.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A system for automatically tracking a face position and recognizing a face, comprising:
    a capturing unit configured to capture a face image of a user;
    a face region detection unit configured to detect a face region from the face image, and to output position information of the detected face region;
    a displacement calculation unit configured to measure a displacement of the capturing unit based on the face region position information, such that the face region captured by the capturing unit is moved to a face authentication region;

a driving unit configured to move the capturing unit based on the displacement; and a face recognition unit configured to execute face recognition by comparing a current authentication image input from the face region detection unit, with a plurality of registered face images pre-stored in a database, wherein the face recognition unit executes face recognition by storing the plurality of registered face images with matching frequencies indicating the number of times that the plurality of registered face images have been matched with an authentication image input of a prior face recognition process, and by sequentially comparing the current authentication image with the registered face images having large matching frequencies when the current authentication image is input from the face region detection unit, wherein the plurality of face images pre-stored in the database are classified into a plurality of groups in order of large matching frequency, wherein the face recognition unit firstly compares the current authentication image with users' registered face images which belong to a group having a largest matching frequency, and then compares the current authentication image with users' registered face images which belong to a group having a next largest matching frequency, and wherein the face recognition unit replaces a registered face image having a smallest matching frequency, among the plurality of registered face images, by the current authentication image, at a predetermined time period.

2. The system of claim 1, wherein the displacement calculation unit is configured to measure an up-down rotation angle displacement and a right-left rotation angle displacement of the capturing unit, and wherein the driving unit is configured to change a direction of the capturing unit based on the rotation angle displacement.

3. The system of claim 1, wherein the displacement calculation unit is configured to measure an up-down linear displacement and a right-left rotation angle displacement of the capturing unit, and wherein the driving unit is configured to change a direction of the capturing unit based on the linear displacement and the rotation angle displacement.

4. The system of claim 1, wherein the face region detection unit detects the face region by sequentially examining the face image input from the capturing unit, in unit of blocks having a predetermined size.

5. The system of claim 1, further comprising a display unit configured to output the face image to the user, wherein the capturing unit includes an infrared ray camera and a color camera, and wherein a face image captured by the infrared ray camera is output to the face region detection unit, and a face image captured by the color camera is output to the display unit.

6. The system of claim 1, further comprising an illumination unit installed near the capturing unit and configured to illuminate a face of the user.

7. The system of claim 1, further comprising:

a face recognition unit configured to execute face recognition by comparing an authentication image input from the face region detection unit, with the plurality of registered face images pre-stored in the database; and a communication unit configured to transmit a face recognition result input from the face recognition unit, to a door lock in a wired or wireless manner, such that the door lock is open or closed based on the face recognition result.

8. A method for automatically tracking a face position and recognizing a face, comprising:

(a) capturing a face image of a user by a capturing unit;

(b) detecting a face region from the face image, and outputting position information of the detected face region;

(c) calculating a displacement of the capturing unit based on the face region position information, such that the face region is moved to a face authentication region;

(d) moving the capturing unit based on the displacement; and (e) executing face recognition by comparing a current authentication image located within the face authentication region with a plurality of registered face images pre-stored in a database, if the face image is located within the face authentication region as the capturing unit is moved, wherein the database stores therein the plurality of registered face images with matching frequencies indicating the number of times that the plurality of registered face images have been matched with an authentication image of a prior face recognition process, wherein in the step (e), face recognition is executed by sequentially comparing the current authentication image with the registered face images having large matching frequencies, wherein the face images stored in the database are classified into a plurality of groups in order of large matching frequency, wherein in the step (e), the authentication image is firstly compared with users' registered face images which belong to a group having a largest matching frequency, and then is compared with users' registered face images which belong to a group having a next largest matching frequency, and wherein in the step (e), a registered face image having a smallest matching frequency, among the plurality of registered face images, is replaced by the current authentication image, at a predetermined time period.

9. The method of claim 8, wherein in the step (c), an up-down rotation angle displacement and a right-left rotation angle displacement of the capturing unit are measured, and wherein in the step (d), a direction of the capturing unit is changed based on the rotation angle displacement.

10. The method of claim 8, wherein in the step (c), an up-down linear displacement and a right-left rotation angle displacement of the capturing unit are measured, and wherein in the step (d), a direction of the capturing unit is changed based on the linear displacement and the rotation angle displacement.

11. The method of claim 8, wherein in the step (b), the face region is detected by sequentially examining the face image input from the capturing unit, in unit of blocks having a predetermined size.

12. The method of claim 8, wherein the capturing unit includes an infrared ray camera and a color camera, wherein in the step (a), a face image of the user captured by the color camera is output to a display unit, and wherein in the step (b), a face region is detected from a face image captured by the infrared ray camera.

13. The method of claim 8, wherein in the step (a), the face image of the user is captured by illuminating a face of the user by an illumination unit installed near the capturing unit.

14. The method of claim 8, further comprising (f) transmitting a face recognition result to a door lock in a wired or wireless manner, such that the door lock is open or closed based on the face recognition result obtained in the step (e).

\* \* \* \* \*